United States Patent
Lee et al.

(10) Patent No.: US 8,223,399 B1
(45) Date of Patent: Jul. 17, 2012

(54) PRINTER INCLUDING OUTPUT MATCHING

(75) Inventors: Jeho Lee, San Diego, CA (US); Jay S. Gondek, Camas, WA (US); Woonyoung Jang, San Diego, CA (US); Otto Sievert, Oceanside, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 788 days.

(21) Appl. No.: 12/402,004

(22) Filed: Mar. 11, 2009

(51) Int. Cl.
*H04N 1/60* (2006.01)
*H04N 1/46* (2006.01)
*G03F 3/08* (2006.01)

(52) U.S. Cl. .................... 358/1.9; 358/504; 358/518

(58) Field of Classification Search .................. 358/1.9, 358/406, 504, 518
See application file for complete search history.

(56) References Cited

U.S. PATENT DOCUMENTS

| | | | |
|---|---|---|---|
| 6,008,907 A | 12/1999 | Vigneau et al. | |
| 6,825,952 B1 | 11/2004 | Lee et al. | |
| 7,050,196 B1 | 5/2006 | Piatt et al. | |
| 7,154,634 B2 | 12/2006 | Hung | |
| 7,477,418 B2 * | 1/2009 | Tobie et al. | 358/1.9 |
| 7,652,791 B2 * | 1/2010 | McCarthy et al. | 358/1.9 |
| 2005/0270325 A1 | 12/2005 | Cavill et al. | |

* cited by examiner

*Primary Examiner* — Charlotte M Baker

(57) ABSTRACT

A printing system includes a first module configured for capturing an image of a target printer test page including a plurality of color patches and configured to provide color data for each color patch; and a second module configured for generating a color modification based on the color data for each color patch of the target printer test page and color data for a reference printer, wherein the target printer is configured to print images converted using the color modification such that an output of the target printer substantially matches an output of the reference printer.

15 Claims, 8 Drawing Sheets

PRINTER INCLUDING OUTPUT MATCHING

BACKGROUND

Printers are designed for different uses, have different numbers of colors of ink, die, or toner, and use different technologies. As a result, printers provide different color renderings. Therefore, the output of an image printed on one printer may not look the same as the output of the image printed on another printer. This lack of matching output may occur even for different printers of the same model. Customers would like all prints or re-prints of the same image to look the same no matter when or where the prints are generated. Further, customers would like to produce an output that looks, as much as possible, like the output of existing printers.

For these and other reasons, a need exists for the present invention.

DETAILED DESCRIPTION

In the following detailed description, reference is made to the accompanying drawings which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

It is to be understood that the features of the various exemplary embodiments described herein may be combined with each other, unless specifically noted otherwise.

Figure 1:
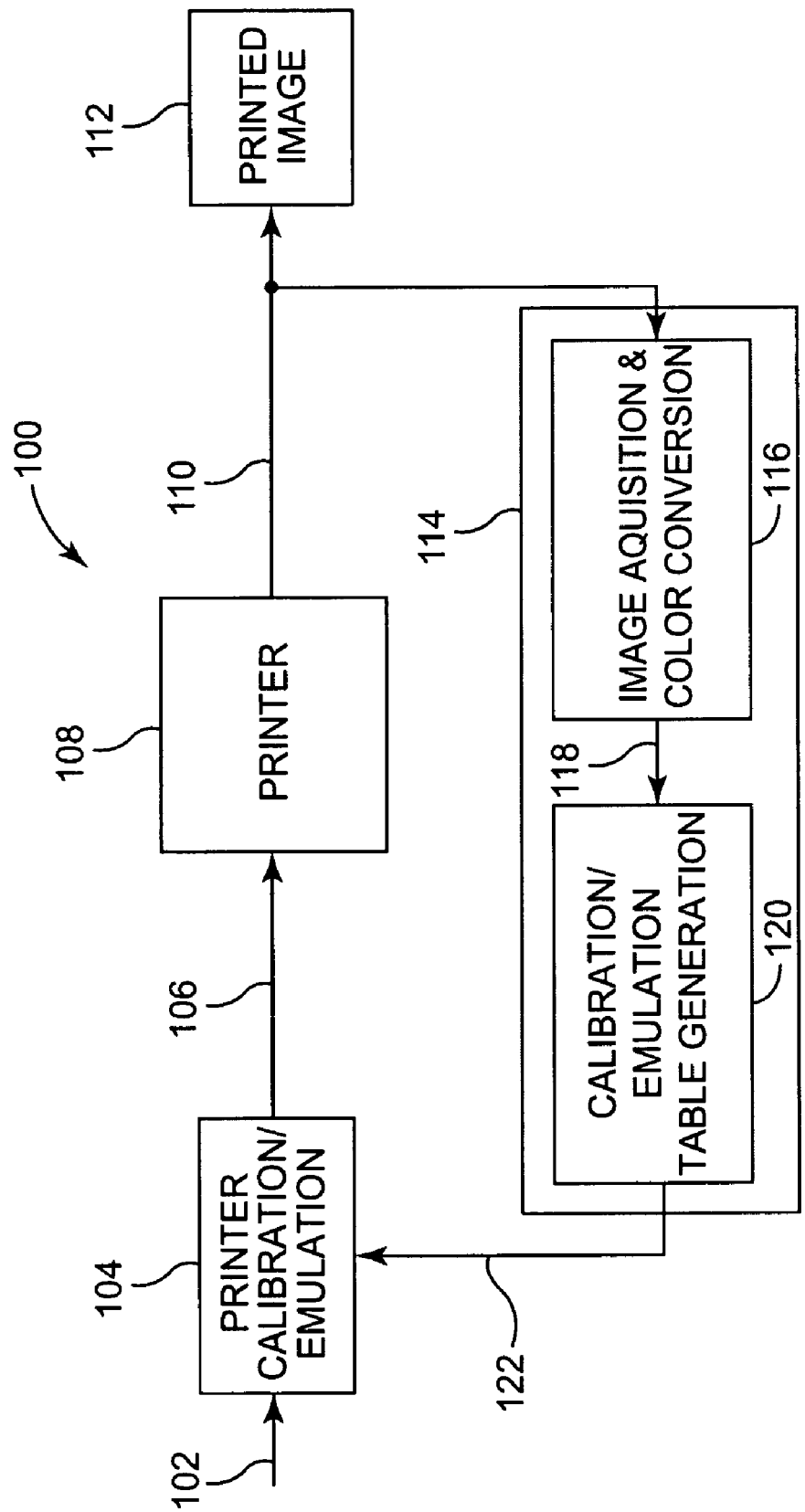
FIG. 1 is a block diagram illustrating one embodiment of a printing system.

FIG. 1 is a block diagram illustrating one embodiment of a printing system 100. Printing system 100 includes a printer calibration/emulation module 104, a printer 108, and an image based calibration/emulation table generation module 114. Image based calibration/emulation table generation module 114 includes an image acquisition and color conversion submodule 116 and a calibration/emulation table generation submodule 120. A first input of printer calibration/emulation module 104 receives an image to be printed by printer 108 on communication link 102. The output of printer calibration/emulation module 104 is communicatively coupled to the input of printer 108 through communication link 106. Printer 108 generates a printed image 112 through path 110. In one embodiment, printer 108 can pass printed image 112 directly to the input of image acquisition and conversion submodule 116 through path 110. The output of image acquisition and conversion submodule 116 is communicatively coupled to calibration/emulation table generation submodule 120 through communication link 118. The output of calibration/emulation table generation submodule 120 is communicatively coupled to a second input of printer calibration/emulation module 104 through communication link 122.

Printing system 100 is calibrated using a scanner or camera based calibration/emulation method to provide printed images on a target printer that match or look substantially the same as printed images on a reference printer. In one embodiment, any suitable number of target printers is matched to a single reference printer. The target printers and the reference printer may include the same printer model or different models from the same or different manufacturers. The target printers and the reference printer may include the same type of printing technology or different types of printing technology.

Printer calibration/emulation module 104 receives data for an image to be printed on printer 108 through communication link 102 and outputs converted data for the image on communication link 106. In one embodiment, printer calibration/emulation module 104 converts the data for the image using a color modification, such as a three dimensional lookup table (3D-LUT), so that the printed image 112 of printer 108 will match or look substantially similar to the printed image of a reference printer. In other embodiments, printer calibration/emulation module 104 converts the data for the image using other color modifications, such as polynomials, neural networks, matrices, higher-order (e.g., four-dimensional) lookup tables, or other suitable mathematical models, so that the printed image 112 of printer 108 will match or look substantially similar to the printed image of a reference printer.

Printer 108 receives the converted data for the image through communication link 106 and generates printed image 112 through path 110 based on the converted data. Printer 108 is any suitable printer, such as an inkjet printer, a solid ink printer, a dye-sublimation printer, or a laser printer. Printed image 112 is printed on any suitable print medium, such as paper, card stock, photo paper, transparencies, Mylar, and the like.

To initially calibrate and/or emulate printing system 100 such that printer 108 generates printed images matched to printed images of a reference printer, image based printer emulation/calibration module 114 is used. To calibrate printing system 100, a printed image 112 is generated including a plurality of color patches. The printed image including the plurality of color patches is generated without first converting the image data in printer calibration/emulation module 104. The printed image including the plurality of color patches is passed to image acquisition and color conversion submodule 116 through path 110.

In one embodiment, image acquisition and color conversion submodule 116 includes an optical scanner. In another embodiment, image acquisition and color conversion submodule 116 includes an optical or digital camera. In one embodiment, path 110 is physically connected to printer 108 such that the printed image can be automatically passed to the scanner without user intervention. In another embodiment, the printed image is manually passed by a user between printer 108 and the scanner. The scanner scans the image or the camera photographs the image of the plurality of color patches, converts the scanned image data to color data for each color patch, and passes the color data to calibration/emulation table generation submodule 120 through communication link 118.

In one embodiment, calibration/emulation table generation submodule 120 generates a color modification, such as a 3D-LUT based on the color data for each color patch and color data from a reference printer. In other embodiments, calibration/emulation table generation submodule 120 generates other color modifications, such as polynomials, neural networks, matrices, higher-order (e.g., four-dimensional) lookup tables, or other suitable mathematical models based on the color data for each color patch and color data from a reference printer. In one embodiment, the color data from the reference printer is obtained using image acquisition and color conversion submodule 116 or a similar module. In one embodiment, the color data from the reference printer is stored within calibration/emulation table generation submodule 120. Calibration/emulation table generation submodule 120 passes the 3D-LUT to printer calibration/emulation module 104 through communication link 122. Once the initial calibration of printing system 100 is complete, the data for each image to be printed by printer 108 is first converted by printer calibration/emulation module 104 using the 3D-LUT such that the output of printer 108 matches or looks substantially the same as the output of the reference printer.

Figure 2:
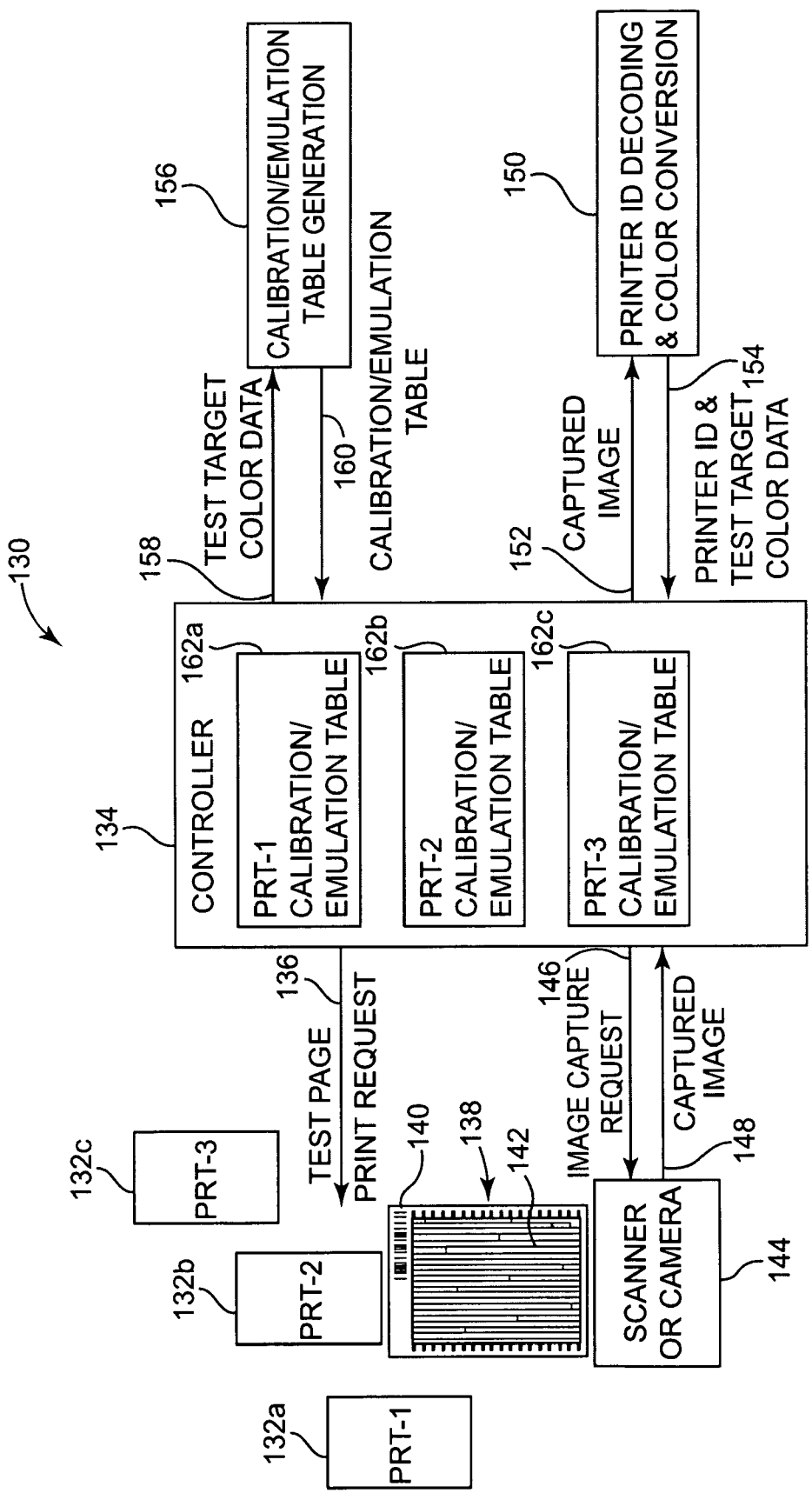
FIG. 2 is a block diagram illustrating one embodiment of an image based printer emulation/calibration system.

FIG. 2 is a block diagram illustrating one embodiment of an image based printer emulation/calibration system 130. In this embodiment, image based printer emulation/calibration system 130 is configured for determining 3D-LUTs for three target printers 132a-132c. In other embodiments, image based printer emulation/calibration system 130 is configured for determining 3D-LUTs for any suitable number of target printers. Image based printer emulation/calibration system 130 includes a controller 134, an optical scanner or digital camera 144, a printer identification decoding and color conversion module 150, and a calibration/emulation table generation module 156.

Controller 134 includes a computer, microprocessor, microcontroller, or other suitable logic circuitry for controlling the operation of image based printer emulation/calibration system 130. To begin the emulation/calibration process, controller 134 issues a test page print request as indicated at 136 to a target printer, such as printer two (PRT-2) 132b. In response to the test page print request, printer two 132b generates a test page 138. In one embodiment, test page 138 includes a plurality of color patches 142 and a printer identifier 140. Color patches 142 include a suitable number of color patches, such as 1000 color patches or another suitable number. Depending on the character of the specific devices and the accuracy expectation, more or less color patches may be used. Printer identifier 140 uniquely identifies printer two 132b. In one embodiment, printer identifier 140 includes a barcode or another suitable machine readable mark that uniquely identifies printer two 132b. In one embodiment, printer identifier 140 includes a printer unit identity, such as the serial number of printer two 132b, and a printer model identifier. Test page 138 is automatically or manually passed to scanner or camera 144.

Controller 134 then issues an image capture request as indicated at 146 to scanner or camera 144. In response to the image capture request, scanner or camera 144 scans or photographs test page 138. Scanner or camera 144 outputs the captured image of test page 138 as indicated at 148 to controller 134. Scanner or camera 144 outputs the captured image of test page 138 as a PNG image, a TIFF image, or another suitable image.

Controller 134 then passes the captured image of test page 138 to printer identification decoding and color conversion module 150 as indicated at 152. Printer identification decoding and color conversion module 150 includes a computer, microprocessor, microcontroller, or other suitable logic circuitry for performing printer identification decoding and color conversion. Printer identification decoding and color conversion module 150 decodes printer identifier 140 of the captured image of test page 138 to provide the printer identifier for printer two 132b. Printer identification decoding and color conversion module 150 also converts the captured image to device-independent color data such as CIE XYZ or CIE L*a*b* for each color patch to provide colorimetric data. Printer identification decoding and color conversion module 150 passes the printer identifier and the test target color data to controller 134 as indicated at 154.

Controller 134 then passes the test target color data to calibration/emulation table generation module 156 as indicated at 158. Calibration/emulation table generation module 156 includes a computer, microprocessor, microcontroller, or other suitable logic circuitry for performing calibration/emulation table generation. Calibration/emulation table generation module 156 generates a calibration/emulation table based on the test target color data for printer two 132b. The calibration/emulation table is generated based on the test target color data for printer two 132b and reference color data for a reference printer. In one embodiment, the reference color data from the reference printer is obtained using a similar process as discussed for obtaining the test target color data for printer two 132b. In one embodiment, the color data from the reference printer is stored within calibration/emulation table generation module 156. Calibration/emulation table generation module 156 passes the calibration/emulation table to controller 134 as indicated at 160.

The calibration/emulation table for printer two 132b is then stored within controller 134 as indicated at 162b. Likewise, a similar process is performed to obtain calibration/emulation tables for printer one 132a and printer three 132c. The calibration/emulation table for printer one 132a is stored in controller 134 as indicated at 162a and the calibration/emulation table for printer three 132c is stored in controller 134 as indicated at 162c. Once the initial calibration of each printer 132a-132c is complete, the data for each image to be printed by a selected printer 132a-132c is first converted by controller 134 using the associated calibration/emulation table for the selected printer. As such, the output of each printer 132a-132c matches or looks substantially the same as the output of the reference printer.

Figure 3:
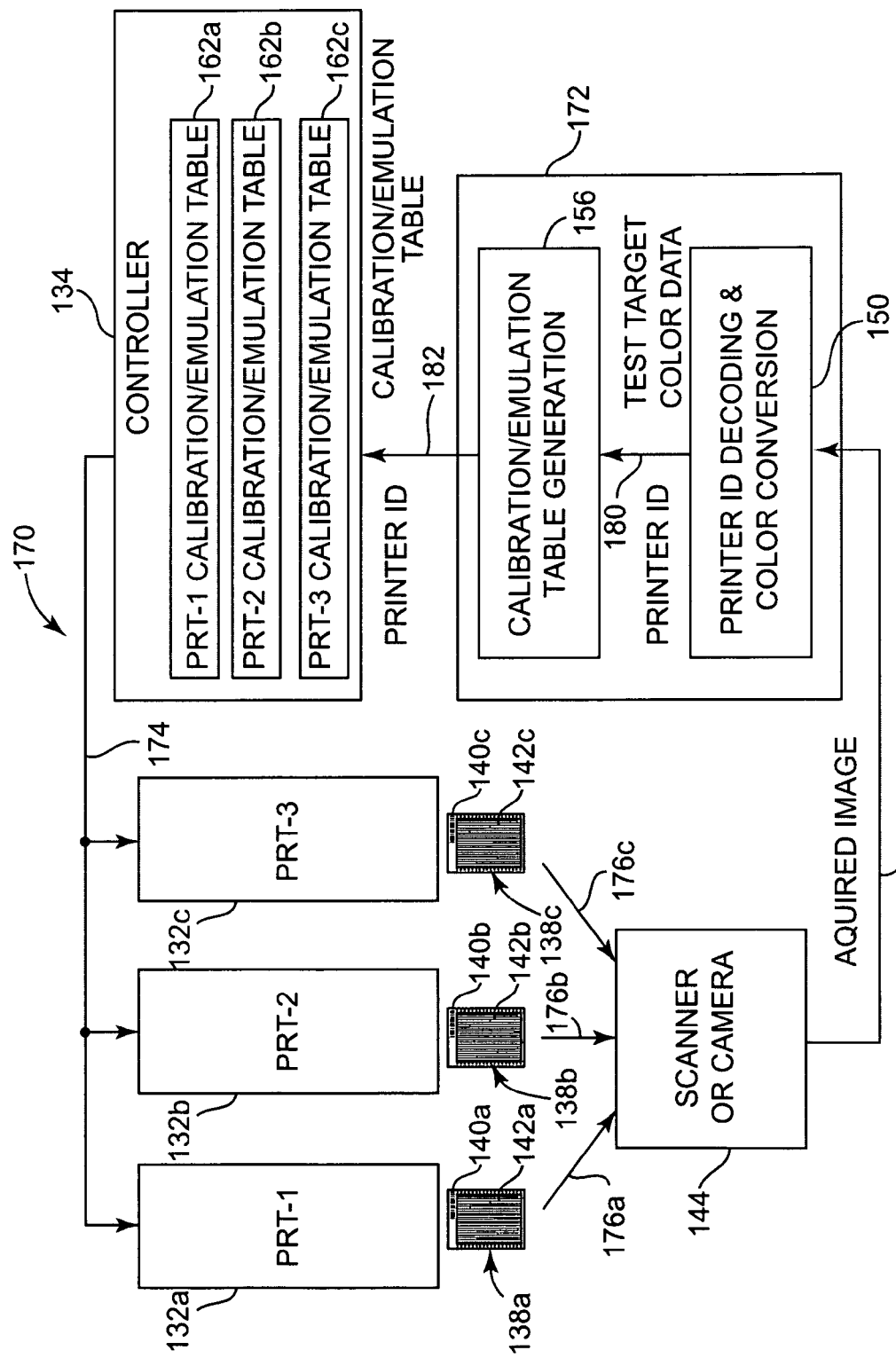
FIG. 3 is a block diagram illustrating another embodiment of an image based printer emulation/calibration system.

FIG. 3 is a block diagram illustrating another embodiment of an image based printer emulation/calibration system 170. In this embodiment, image based printer emulation/calibration system 170 is configured for determining 3D-LUTs for three target printers 132a-132c. In other embodiments, scanner based printer emulation/calibration system 170 is configured for determining 3D-LUTs for any suitable number of target printers. Image based printer emulation/calibration system 170 includes a controller 134, a scanner or camera 144, and an emulation/calibration module 172. Emulation/calibration module 172 includes a printer identification decoding and color conversion submodule 150 and a calibration/emulation table generation submodule 156.

The output of controller 134 is communicatively coupled to each target printer 132a-132c through communication link 174. The output of scanner or camera 144 is communicatively coupled to the input of printer identification decoding and color conversion submodule 150 of emulation/calibration module 172 through communication link 178. The output of printer identification decoding and color conversion submodule 150 is communicatively coupled to the input of calibration/emulation table generation submodule 156 through communication link 180. The output of calibration/emulation table generation submodule 156 is communicatively coupled to the input of controller 134 through communication link 182.

Controller 134 includes a computer, microprocessor, microcontroller, or other suitable logic circuitry for controlling the operation of image based printer emulation/calibration system 170. To begin the emulation/calibration process, controller 134 issues a test page print request to each target printer 132*a*-132*c* through communication link 174. In response to the test page print request, each printer 132*a*-132*c* generates a test page 138*a*-138*c*, respectively. In one embodiment, each test page 138*a*-138*c* includes a plurality of color patches 142*a*-142*c* and a printer identifier 140*a*-140*c*, respectively. Color patches 142*a*-142*c* each include a suitable number of color patches, such as 1000 color patches or another suitable number. Each printer identifier 140*a*-140*c* uniquely identifies each printer 132*a*-132*c*, respectively. In one embodiment, each printer identifier 140*a*-140*c* includes a barcode or another suitable machine readable mark that uniquely identifies each printer 132*a*-132*c*, respectively. In one embodiment, each printer identifier 140*a*-140*c* includes a printer unit identity, such as the serial number of printer 132*a*-132*c*, and a printer model identifier, respectively. Each test page 138*a*-138*c* is automatically or manually passed to scanner or camera 144 as indicated at 176*a*-176*c*, respectively. Scanner or camera 144 scans or photographs each test page 138*a*-138*c*.

Scanner or camera 144 passes a scanned image or photographed image for each test page 138*a*-138*c* to printer identification decoding and color conversion submodule 150 through communication link 178. Scanner or camera 144 outputs the scanned image or photographed image of each test page 138*a*-138*c* as a PNG image, a TIFF image, or another suitable image.

Printer identification decoding and color conversion submodule 150 includes a computer, microprocessor, microcontroller, or other suitable logic circuitry for performing printer identification decoding and color conversion. Printer identification decoding and color conversion submodule 150 decodes each printer identifier 140*a*-140*c* of the scanned image of test pages 138*a*-138*c* to provide the printer identifier for each printer 132*a*-132*c*, respectively. Printer identification decoding and color conversion submodule 150 also converts each scanned image to color data for each color patch to provide test target color data for each printer 132*a*-132*c*. The decoded printer identifier for each printer 132*a*-132*c* is linked to the test target color data for each printer 132*a*-132*c*, respectively. Printer identification decoding and color conversion submodule 150 passes the linked printer identifier and test target color data for each printer 132*a*-132*c* to calibration/emulation table generation submodule 156 through communication link 180.

Calibration/emulation table generation submodule 156 includes a computer, microprocessor, microcontroller, or other suitable logic circuitry for performing calibration/emulation table generation. Calibration/emulation table generation submodule 156 generates a calibration/emulation table for each printer 132*a*-132*c* based on the test target color data for each printer 132*a*-132*c*. Each calibration/emulation table is generated based on the test target color data for each printer 132*a*-132*c* and reference color data for a reference printer. In one embodiment, the reference color data from the reference printer is obtained using a similar process as discussed for obtaining the test target color data for each printer 132*a*-132*c*. In one embodiment, the color data from the reference printer is stored within calibration/emulation table generation submodule 156. The test target color data for each printer 132*a*-132*c* is linked to the decoded printer identifier for each printer 132*a*-132*c*, respectively. Calibration/emulation table generation submodule 156 passes the linked printer identifier and calibration/emulation table for each printer 132*a*-132*c* to controller 134 through communication link 182.

The calibration/emulation table for each printer 132*a*-132*c* is then stored within controller 134 as indicated at 162*a*-162*c*, respectively. Once the initial calibration of each printer 132*a*-132*c* is complete, the data for each image to be printed by a selected printer 132*a*-132*c* is first converted by controller 134 using the associated calibration/emulation table for the selected printer. As such, the output of each printer 132*a*-132*c* matches or looks substantially the same as the output of the reference printer.

Figure 4:
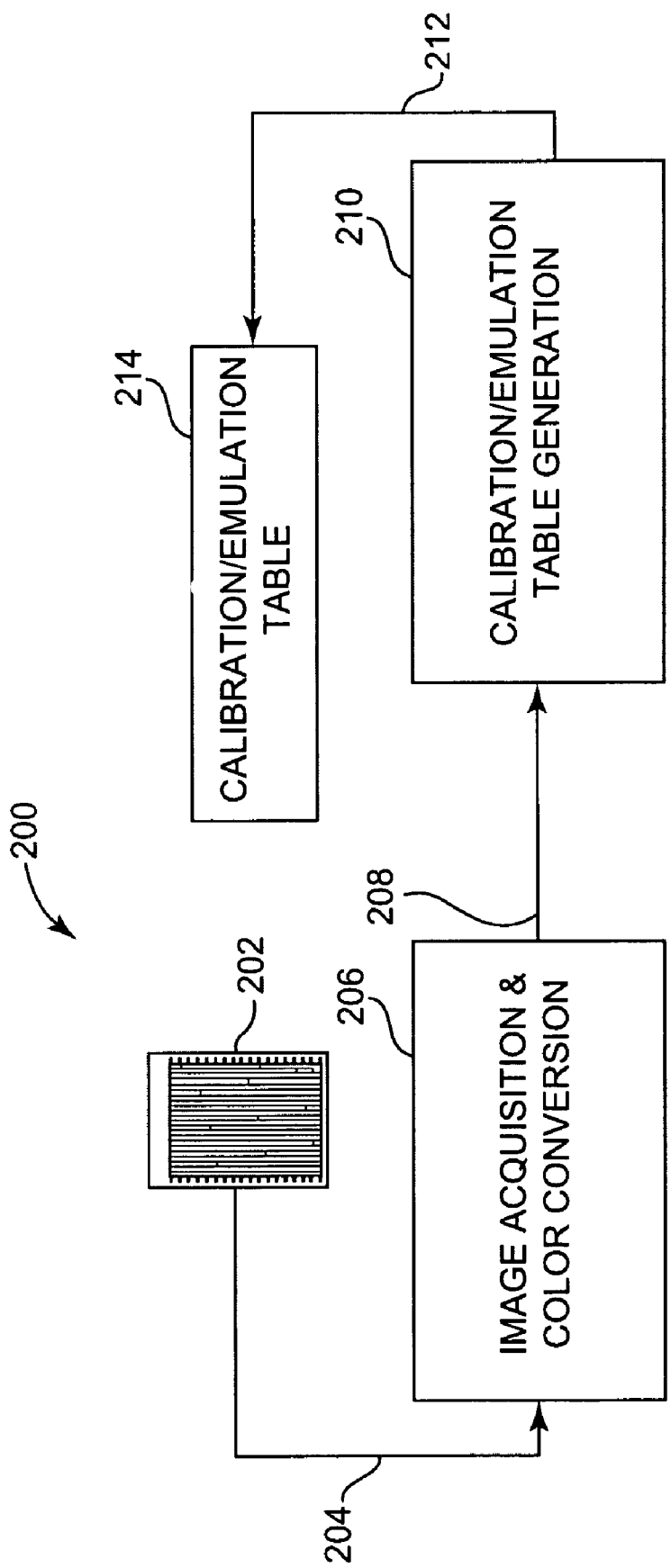
FIG. 4 is a block diagram illustrating another embodiment of an image based printer emulation/calibration system.

FIG. 4 is a block diagram illustrating another embodiment of an image based printer emulation/calibration system 200. Image based printer emulation/calibration system 200 includes an image acquisition and color conversion module 206 and a calibration/emulation table generation module 210. The input of image acquisition and color conversion module 206 receives a test page 202 printed on a reference printer or target printer through path 204. The output of image acquisition and color conversion module 206 is communicatively coupled to the input of calibration/emulation table generation module 210 through communication link 208. The output of calibration/emulation table generation module 210 provides a 3D RGB-to-RGB map or calibration/emulation table 214 through communication link 212.

Test page 138 includes a plurality of color patches. Test page 138 is scanned by image acquisition and color conversion module 206. Image acquisition and color conversion module 206 includes an optical scanner or digital camera and a computer, microprocessor, microcontroller, or other suitable logic circuitry for controlling the scanner or camera and processing image data. Image acquisition and color conversion module 206 converts the acquired image of test page 138 to color data for each color patch. In one embodiment, image acquisition and color conversion module 206 outputs the color data in CIE-XYZ format. The color data is passed to calibration/emulation table generation module 210 through communication link 208.

Calibration/emulation table generation module 210 receives the color data through communication link 208 and outputs a calibration/emulation table 214 through communication link 212. Calibration/emulation table generation module 210 includes a computer, microprocessor, microcontroller, or other suitable logic circuitry for generating the calibration/emulation table, such as 3D RGB-to-RGB map. The calibration/emulation table is generated based on the color data from a target printer and color data from a reference printer. In one embodiment, the color data from the reference printer is obtained using a test page 202 from the reference printer and image acquisition and color conversion module 206.

Figure 5:
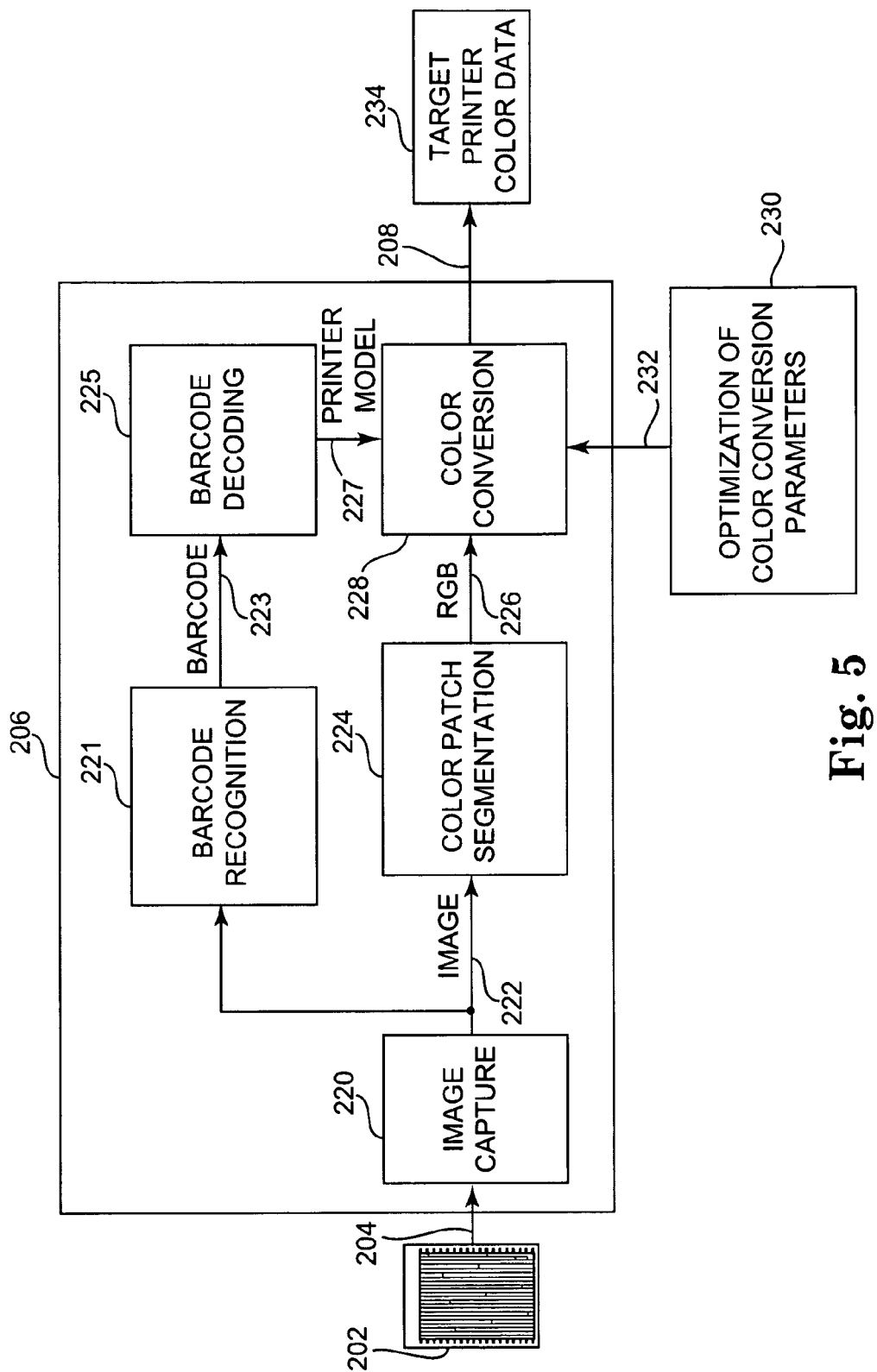
FIG. 5 is a block diagram illustrating one embodiment of an image acquisition and color conversion module.

FIG. 5 is a block diagram illustrating one embodiment of an image acquisition and color conversion module 206. Image acquisition and color conversion module 206 includes an image capture submodule 220, a barcode recognition submodule 221, a barcode decoding submodule 225, a color patch segmentation submodule 224, and a color conversion submodule 228. The input of image capture submodule 220 receives a test page 202 through path 204. The output of image capture submodule 220 is communicatively coupled to the input of barcode recognition submodule 221 and to the input of color patch segmentation submodule 224 through communication link 222.

The output of color patch segmentation submodule 224 is communicatively coupled to a first input of color conversion submodule 228 through signal path 226. The output of barcode recognition submodule 221 is communicatively coupled to the input of barcode decoding submodule 225 through communication link 223. The output of barcode decoding submodule 225 is communicatively coupled to a second input of color conversion submodule 228 through communication link 227. In one embodiment, a third input of color conversion submodule 228 receives color conversion parameters 230 through communication link 232. The output of color conversion submodule 228 provides color data 234 through communication link 208.

Image capture submodule 220 includes an optical scanner or digital camera and associated logic for scanning or photographing test page 202 and outputting an image file on communication link 222. The image file output on communication link 222 includes a TIFF image file, a PNG image file, or another suitable image file. Color patch segmentation submodule 224 receives the image file through communication link 222 and segments each color patch. Color patch segmentation submodule 224 outputs the average RGB value for each color patch on communication link 226.

Barcode recognition submodule 221 receives the image file through communication link 222 and extracts the barcode from the captured image. Barcode recognition submodule 221 passes the barcode to barcode decoding submodule 225 through communication link 223. Barcode decoding submodule 225 decodes the barcode. In one embodiment, the barcode includes the printer identification and the printer model information. Barcode decoding submodule 225 passes the printer model information to color conversion submodule 228 through communication link 227.

Color conversion submodule 228 receives the RGB value for each color patch through communication link 226, the printer model information through communication link 227, and the color conversion parameters 230 through communication link 232. Color conversion submodule 228 converts the RGB values to colorimetric data using color conversion parameters 230. In one embodiment, color conversion parameters 230 include a universally optimized set of parameters for any suitable printer model. As such, the color conversion parameters 230 do not use any prior information from the target printer. In another embodiment, color conversion parameters 230 are a customized set of parameters for a specific printer model. As such, if the target printer model information is known, for example from the barcode, higher color accuracy may be achieved by using color conversion parameters that are optimized for the target printer model.

In another embodiment, color conversion parameters 230 includes both optimized sets of parameters for multiple printer models and a universally optimized set of parameters for any suitable printer model. Therefore in this embodiment, if color conversion parameters 230 include optimized parameters for a selected target printer model, those parameters are used. If, however, color conversion parameters 230 do not include optimized parameters for the selected target printer model, the universally optimized parameters are used. Color conversion submodule 228 outputs the colorimetric data or color data 234 on communication link 208.

Figure 6:
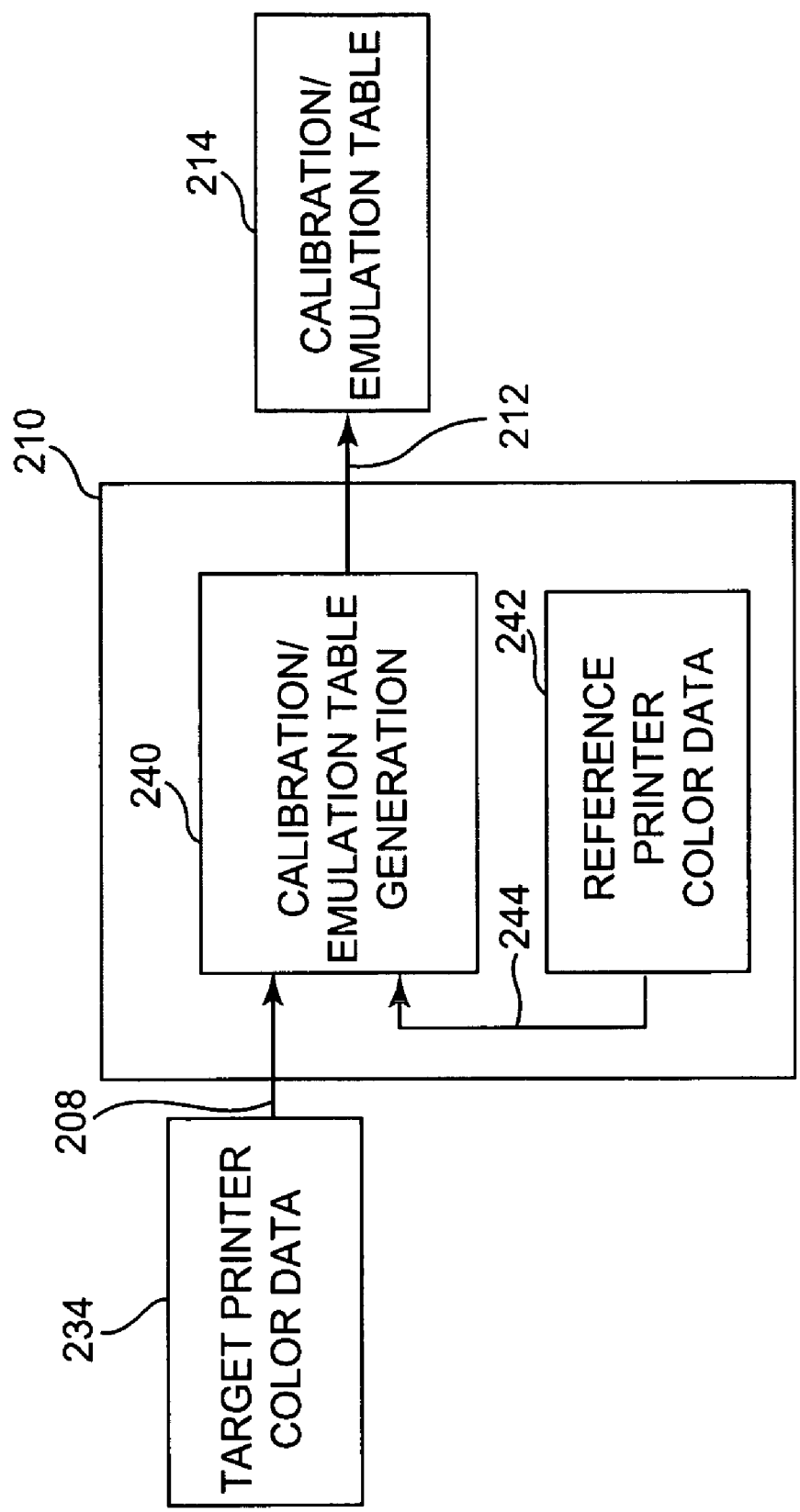
FIG. 6 is a block diagram illustrating one embodiment of a calibration/emulation table generation module.

FIG. 6 is a block diagram illustrating one embodiment of a calibration/emulation table generation module 210. Calibration/emulation table generation module 210 includes a calibration/emulation table generation submodule 240, and stored reference printer color data 242. A first input of calibration/emulation table generation submodule 240 receives target printer color data 234 through communication link 208.

A second input of calibration/emulation table generation submodule 240 receives reference printer color data 242 through communication link 244. The output of calibration/emulation table generation submodule 240 provides a calibration/emulation table 214 through communication link 212.

Calibration/emulation table generation submodule 240 performs blackpoint compensation on the color data by scaling the color data from the target printer to the color data of the reference printer to match the black points while preserving the original white point. In one embodiment, the tone reproduction curve is tuned to compensate for media gloss differences or to provide the best match for the target application.

Calibration/emulation table generation submodule 240 provides a 3D RGB-to-RGB map or calibration/emulation table 214 through communication link 212. Calibration/emulation table generation submodule 240 gamut maps the printer colors of the target printer to match the reference printer. The gamut mapping is a function of the input gamut of the reference printer and the output gamut of the target printer. The gamut mapping is a pointwise operation from an input point to an output point in an appropriate 3D color space (e.g., RGB) and is represented as a 3D-LUT that embodies a pointwise target color transform.

In one embodiment, for office printing applications such as logo, business cards, and graphic arts printings, the gray component (or lack thereof) and the color purity for an original gamut surface color are preserved. The color purity of gamut surface colors are preserved by moving source surface colors to destination surface colors and not allowing source colors without a gray component to map to a color that contains black.

In one embodiment to preserve the gray component and the color purity, first the light and dark surface colors in RGB axis of the 3D color coordinate system are indentified. In one embodiment, this is done by looking at the RGB input value of the computation target point to see if at least one of its R, G, and B values is equal to the minimum (i.e., darkest) or the maximum (i.e., lightest) value. The near surface color is then checked to determine whether it is inside gamut or outside gamut. As used herein, the phrase "inside gamut" refers to a range of color that can be reproduced within the printer device color space. Any suitable algorithm may be used to map out of gamut colors. For those near surface points that are inside the printer gamut, calibration/emulation table generation submodule 240 moves them out toward the gamut surface. In one embodiment, this is done by manipulating the corresponding colorimetric data. The corresponding colorimetric data is converted into LCH data (i.e., lightness, chroma, and hue) format. The chroma is then increased by a value c, such as 0.5. Hence, for given RGB data, the corresponding colorimetric data becomes more chromatic after this chroma modification. The modified color data is then checked again to determine whether it is still inside gamut. If the modified color data is still inside gamut, the process is repeated until the modified color data goes out of gamut.

Figure 7:
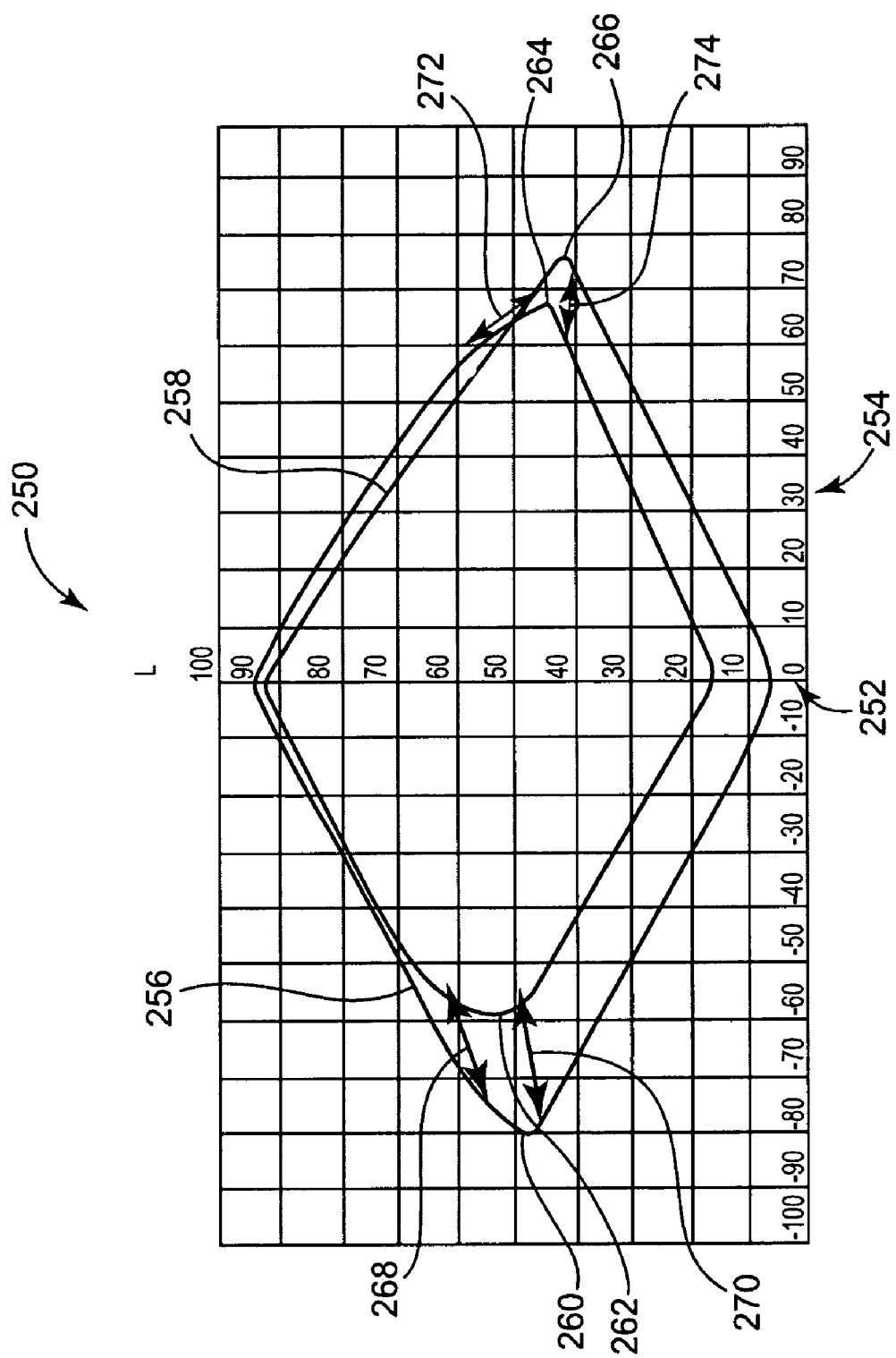
FIG. 7 is a chart illustrating one embodiment of the preservation of the gray component of gamut surface colors.

If the source color is lighter than the maximum chroma cusp, the source color is mapped along a vector that will not allow the source color to fall below the destination cusp. As used herein, "cusp" refers to a point of maximum chroma in a given hue slice. This is illustrated in FIG. 7. FIG. 7 is a chart 250 illustrating one embodiment of the preservation of the gray component of gamut surface colors. Chart 250 includes lightness on y-axis 252 and chroma on x-axis 254. In one embodiment, a gamut of a target printer is indicated at 256 and a gamut of a reference printer is indicated at 258. In another embodiment, a gamut of a target printer is indicated at 258 and a gamut of a reference printer is indicated at 256. Therefore, a gamut of the target printer may be larger or smaller than a gamut of the reference printer. The cusps are indicated at 260, 262, 264, and 266.

If the source color is below the cusp, the source color is mapped along a vector equal to or less than the cusp as indicated at 268, 270, 272, and 274. Therefore in one embodiment, after the vector for mapping to the surface is determined, which may be constant L*, for example, if that vector lands on the wrong side of the cusp, the source color is mapped toward the cusp instead. This applies whether the destination color gamut is moving in or moving out. Therefore, the source surface color is mapped to the destination surface color to preserve surface color characteristics whether the mapping is moving in or moving out.

Similarly, color purity is preserved for device colors, such as yellow. If the vector that would map a pure yellow to the surface (i.e., a color where R=G and R&G>B) lands on the wrong side of the yellow cusp, the vector is fixed to yellow. If the source color is yellow slightly toward green, the source color should not map to the device space location that has magenta (either no magenta or some cyan). Similarly, if the source color is orangish, the source color should also not cross the yellow boundary (i.e., if the source color is R>G>B, the source color should map on the orange side of device yellow, if the source color is G>R>B, the source color should map on the green side). This is similar to what is done for the black component across the maximum chroma cusp, but in this case it is applied to the pure yellow cusp. This can similarly be done for device cyan and device magenta to preserve device color purity and the relationship between colors in the mapped space.

In one embodiment, calibration/emulation table generation submodule 240 also includes controls to fine tune the balance of the neutral axis and to make hue adjustments to balance color illuminant issues that are common when reproducing color across different ink sets or toners. The result of the scaling, gamut mapping, and tuning is a 3D RGB-to-RGB map or calibration/emulation table 214 that converts an input image accordingly through a 3D interpolation. In this way, an image printed on the target printer matches or looks substantially the same as the image printed on the reference printer.

Figure 8:
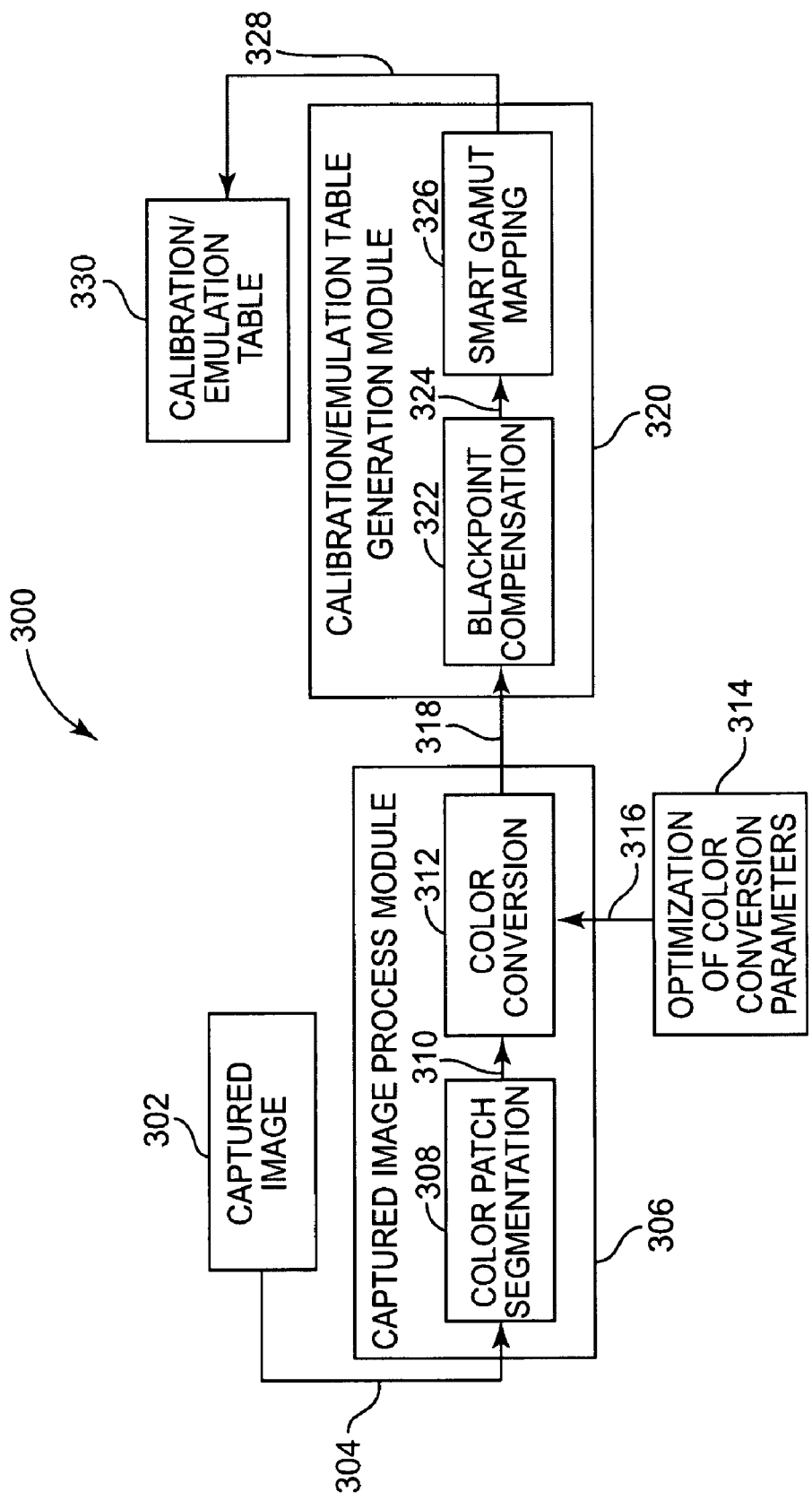
FIG. 8 is a block diagram illustrating another embodiment of an image based printer emulation/calibration system.

FIG. 8 is a block diagram illustrating another embodiment of an image based printer emulation/calibration system 300. Image based printer emulation/calibration system 300 includes a captured image process module 306 and a calibration/emulation table generation module 320. Captured image process module 306 includes a color path segmentation submodule 308 and a color conversion submodule 312. Calibration/emulation table generation module 320 includes a blackpoint compensation submodule 322 and a smart gamut mapping submodule 326.

The input of color patch segmentation submodule 308 receives a scanned test target 302 through communication link 304. The output of color patch segmentation submodule 308 is communicatively coupled to a first input of color conversion submodule 312 through communication link 310. A second input of color conversion submodule 312 receives color conversion parameter data 314 through communication link 316. The output of color conversion submodule 312 is communicatively coupled to the input of blackpoint compensation submodule 322 through communication link 318. The output of blackpoint compensation submodule 322 is communicatively coupled to the input of smart gamut mapping submodule 326 through communication link 324. The output of smart gamut mapping submodule 326 provides an RGB-to-RGB 3D LUT or calibration/emulation table 330 through communication link 328.

A test target including a set of color patches is printed from a reference printer and a target printer. The printed images are then scanned and stored in the form of raw device RGB format to provide scanned test targets 302. From the scanned images, each color patch is segmented by color patch segmentation submodule 308 and the average of each segmented area is determined to provide raw device RGB values for each color patch. The raw device RGB values are then converted to colorimetric data by color conversion submodule 312 using color conversion parameters 314 that are optimized for the printer model used. Next, blackpoint compensation submodule 322 performs blackpoint compensation by scaling the colorimetric data in a device-independent color space, such as XYZ. After scaling, smart gamut mapping submodule 326 gamut maps to match the printer colors to the target printer. Smart gamut mapping includes preserving the gray component (or lack thereof) and the color purity for an original gamut surface color as previously described. Smart gamut mapping submodule 326 provides an RGB-to-RGB 3D LUT or calibration/emulation table 330, which converts an input image accordingly through the 3D interpolation. In this way, an image printed on the target printer matches or looks substantially the same as the image printed on the reference printer.

Embodiments provide a printing system and/or printers calibrated using a scanner based calibration/emulation method. Once the printing system and/or printers are calibrated, the printers generate printed images that match or look substantially the same as printed images of a reference printer. Therefore, embodiments enable customers to obtain prints or re-prints of the same image that all look substantially the same no matter when or where the prints were generated. In addition, embodiments enable customers to produce an output that looks, as much as possible, like the output of existing printers.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A printing system comprising:
   a first module configured for capturing an image of a target printer test page including a plurality of color patches and configured to provide color data for each color patch; and
   a second module configured for generating a color modification based on the color data for each color patch of the target printer test page and color data for a reference printer, the second module configured for generating the color modification by performing blackpoint compensation,
   wherein the target printer is configured to print images converted using the color modification such that an output of the target printer substantially matches an output of the reference printer.

2. The printing system of claim 1, wherein the target printer test page includes an identifier that uniquely identifies the target printer, and wherein the first module is configured to decode the identifier.

3. The printing system of claim 1, wherein the color modification comprises a three dimensional lookup table.

4. The printing system of claim 1, wherein the second module is configured for generating the color modification by scaling and gamut mapping the target printer to the reference printer based on the color data for each color patch of the target printer test page and the color data for the reference printer.

5. The printing system of claim 1, wherein the color modification preserves a gray component and a color purity of a gamut surface color between the target printer and the reference printer.

6. The printing system of claim 1, wherein the first module comprises one of an optical scanner configured to scan the target printer test page and an optical camera configured to capture the target printer test page.

7. The printing system of claim 1, wherein the first module is configured to segment each color patch of the captured image, determine a color value for each color patch, and convert each color value to colorimetric data based on the target printer model to provide the color data.

8. The printing system of claim 1, wherein the second module is configured for generating the color modification by performing smart gamut mapping.

9. The printing system of claim 1, wherein the second module is configured for generating the color modification by tuning a balance of a neutral axis and adjusting hue to balance color illuminant issues for reproducing color across different ink sets or toners.

10. A method for configuring a target printer, the method comprising:
    printing a test page including color patches on a target printer;
    acquiring an image of the test page;
    converting the image of the test page to color data for each color patch; and
    determining a three dimensional lookup table (3D-LUT) based on the color data for each color patch and color data from a reference printer, the 3D-LUT configured for converting an input image to the target printer such that the target printer provides an output substantially matched to an output of the reference printer,
    wherein determining the 3D-LUT comprises tuning a balance of a neutral axis and adjusting hue to balance color illuminant issues for reproducing color across different ink sets or toners.

11. A method for configuring a target printer, the method comprising:
    printing a test page including color patches on a target printer;
    acquiring an image of the test page;
    converting the image of the test page to color data for each color patch; and
    determining a three dimensional lookup table (3D-LUT) based on the color data for each color patch and color data from a reference printer, the 3D-LUT configured for converting an input image to the target printer such that the target printer provides an output substantially matched to an output of the reference printer,
    wherein printing the test page comprises printing a test page including a printer identifier.

12. A method for configuring a target printer, the method comprising:
    printing a test page including color patches on a target printer;
    acquiring an image of the test page;
    converting the image of the test page to color data for each color patch; and
    determining a three dimensional lookup table (3D-LUT) based on the color data for each color patch and color data from a reference printer, the 3D-LUT configured for converting an input image to the target printer such that the target printer provides an output substantially matched to an output of the reference printer,
    wherein determining the 3D-LUT comprises:
        performing blackpoint compensation on the color data from each color patch; and
        gamut mapping the target printer to the reference printer based on the color data for each color patch of the target printer test page and the color data from the reference printer.

13. The method of claim 12, wherein gamut mapping comprises moving source surface colors to destination surface colors and not allowing source colors without a gray component to map to a color that contains black.

14. A printing system comprising:
    means for obtaining first color data for a reference printer and second color data for a target printer: and
    means for providing a three dimensional (3D) RGB-to-RGB map based on the first color data and the second color data such that an output of the target printer substantially matches an output of the reference printer,
    wherein the means for providing the 3D RGB-to-RGB map comprises means for performing blackpoint compensation and means for performing smart gamut mapping.

15. The printing system of claim 14, wherein the means for performing smart gamut mapping comprises means for preserving a gray component and a color purity of a gamut surface color between the target printer and the reference printer.

* * * * *

UNITED STATES PATENT AND TRADEMARK OFFICE
CERTIFICATE OF CORRECTION

| | | |
|---|---|---|
| PATENT NO. | : 8,223,399 B1 | Page 1 of 1 |
| APPLICATION NO. | : 12/402004 | |
| DATED | : July 17, 2012 | |
| INVENTOR(S) | : Jeho Lee et al. | |

It is certified that error appears in the above-identified patent and that said Letters Patent is hereby corrected as shown below:

In the Claims:

In column 12, line 38, in Claim 14, delete "printer:" and insert -- printer; --, therefor.

Signed and Sealed this
Twenty-fifth Day of December, 2012

David J. Kappos
*Director of the United States Patent and Trademark Office*